(12) United States Patent
Loeffler et al.

(10) Patent No.: US 7,684,923 B2
(45) Date of Patent: Mar. 23, 2010

(54) METHOD FOR OPERATING A SELF-IGNITING INTERNAL COMBUSTION ENGINE, AND CORRESPONDING CONTROL DEVICE

(75) Inventors: Axel Loeffler, Backnang (DE); Wolfgang Fischer, Gerlingen (DE); Roland Karrelmeyer, Bietigheim-Bissingen (DE); Gerald Graf, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/313,398

(22) Filed: Nov. 19, 2008

(65) Prior Publication Data
US 2009/0182482 A1  Jul. 16, 2009

(30) Foreign Application Priority Data
Jan. 15, 2008  (DE) ....................... 10 2008 004 364

(51) Int. Cl.
*F02M 7/28*  (2006.01)

(52) U.S. Cl. ..................................... 701/104; 123/435
(58) Field of Classification Search ................. 701/104; 123/435
See application file for complete search history.

*Primary Examiner*—Hai H Huynh
(74) *Attorney, Agent, or Firm*—Kenyon & Kenyon LLP

(57) ABSTRACT

A method for operating a self-igniting internal combustion engine includes: introduction of a prespecified pre-injection quantity (PI) of a fuel into the internal combustion engine before and/or during an intermediate compression; determination of a pressure characteristic (PZV) in the internal combustion engine during the intermediate compression; pre-specification of a target pressure characteristic (PZV0); comparison of the determined pressure characteristic (PZV) with the prespecified target pressure characteristic (PZV0); determination that no release of energy occurred during the intermediate compression, provided that the determined pressure characteristic (PZV) is lower than the target pressure characteristic (PZV0); and compensation of the non-occurrence of the energy release and its effect on a main combustion.

11 Claims, 3 Drawing Sheets

METHOD FOR OPERATING A SELF-IGNITING INTERNAL COMBUSTION ENGINE, AND CORRESPONDING CONTROL DEVICE

BACKGROUND OF THE INVENTION

1. Field of the Invention

The present invention relates to a control device and a method for operating a self-igniting internal combustion engine.

2. Description of Related Art

Combustion methods used in gasoline engines, often called HCCI methods (homogenous charge compression ignition) or CAI methods (controlled auto ignition) in the literature, are characterized in that a fuel supplied to an internal combustion engine is not externally ignited, but rather is ignited on the basis of a compression and/or a heating of the fuel. In comparison with conventional external ignition methods, these methods are distinguished by economical fuel consumption and low raw pollutant emission. The latter method also has the additional advantage that a relatively expensive exhaust gas aftertreatment system, such as for example a NOx storage catalytic converter, can be done without.

Frequently, in a self-igniting combustion method, before the beginning of the actual injection process a small quantity of fuel is introduced into a cylinder of the internal combustion engine. This is known as a pre-injection, via which the combustion chamber is prepared for the main combustion that follows in the actual operating cycle. The fuel introduced into the cylinder as a pre-injection can be ignited during an intermediate compression. The resulting release of energy causes heating of the combustion chamber, thus supporting the combustion of the main injected fuel quantity in a CAI method.

The quantity of fuel introduced into the internal combustion engine as a pre-injection is also sometimes referred to as a null quantity. By null quantity is meant the smallest possible quantity of a fuel that still results in effective energy release in the following intermediate compression. Null quantity may also refer to a control duration of an injector.

However, in a self-igniting internal combustion engine, and in a corresponding combustion method, the direct trigger in the form of the external ignition for the initiation of the combustion is not present. The combustion position must therefore be carefully adjusted using control quantities of the internal combustion engine. The combustion position is frequently indicated by a crank angle, and designates a specific energy conversion, for example the combustion center MFB50 (mass fraction burned 50%).

Here, the division of the overall injected quantity into a pre-injection and a main injection can in particular have large effects on the combustion position. Even very small deviations of the ratio of the pre-injection to the main injection can have drastic effects on the combustion position. If a combustion takes place too late, it becomes unstable, and a permanent failure may result. If, on the other hand, the combustion takes place too early, unacceptably loud noise results, and the tendency towards engine knock increases. It is therefore desirable to provide a possibility by which a pre-injection can be carried out in such a way that an acceptable combustion position is ensured.

BRIEF SUMMARY OF THE INVENTION

The present invention is based on the recognition that, in a self-igniting internal combustion engine, a satisfactory combustion position throughout the entire duration of engine operation requires multiple redetermination of the null quantity. However, for a user of the vehicle having such an internal combustion engine, this entails a decrease in convenience if it is not possible to carry out the redetermination of the suitable null quantity while the vehicle is traveling. However, the latter requires a method or a control device with which the redetermination of the null quantity can be carried out without affecting the driving behavior and/or the pollutant emissions of the vehicle.

When there is a redetermination of the null quantity, the smallest possible quantity of fuel must be determined that still results in an effective energy release during the intermediate compression. Here there is the risk that if an ignition of the null quantity fails to occur, the following main combustion will take place too late or not at all.

Therefore, the present invention is additionally based on the recognition that a determination of the null quantity during travel is possible only if the lack of ignition of a trial pre-injection quantity can be recognized in a timely manner and quickly compensated. The present invention ensures this by measuring a pressure characteristic during the intermediate compression, and comparing it immediately with a target pressure characteristic. If the pressure characteristic is below the target pressure characteristic, i.e., no ignition of the pre-injection can be detected, the present invention provides that this is reacted to immediately, in order to quickly compensate the effect on a following main combustion of a release of energy that did not take place during the intermediate compression.

Therefore, according to the present invention the combustion position is not first awaited after a pre-injection of a particular quantity of fuel; rather, on the basis of the pressure characteristic during the intermediate compression it is determined immediately whether the administered quantity of fuel is sufficient. Here, after recognition of a pressure characteristic lower than the specified target pressure characteristic, a reaction can take place such that at least the following combustion cycle has a combustion position that corresponds approximately to a desired combustion position. The core of the present invention is therefore a determination of the null quantity, made for each cylinder individually, on the basis of a cylinder pressure signal from which characteristics are obtained for the intermediate compression phase (180° crank angle to 540° crank angle after top dead center), conventionally also called the low-pressure phase, and these characteristics are used as a basis for the determination method.

The obtained characteristics, such as the average pressure in the intermediate compression phase and/or the quantity of energy released in the intermediate compression phase, are frequently also called integral characteristics. They describe for example the constant maintenance of an internal pressure in the cylinder despite the dissipation of heat through the cylinder walls. The integral characteristics ensure reliable recognition of whether a pre-injection quantity is ignited during an intermediate compression. In addition, the integral characteristics are less susceptible to disturbance than are, for example, local characteristics for the direct determination of the energy characteristics released by the pre-injection. Above all, the determination of the average pressure in the intermediate compression phase has the advantage that it can be carried out relatively quickly and easily. Thus, the present invention ensures a rapid reaction to a lacking release of energy during intermediate compression. This reduces the risk when carrying out a test for a possibly suitable null quantity to the residual risk that, at most, a main combustion may occur too late or not at all. However, the too-late occurrence or omission of a single combustion has only a slight adverse effect on the driving behavior of the vehicle. Thus, the method according to the present invention can be carried out during normal stationary engine operation. Possible effects on the combustion are compensated by other control interventions. Test operation, for example during standstill or no-load operation of the vehicle, which would be inconvenient for the driver, is therefore unnecessary.

The method can be carried out for all cylinders simultaneously. It is therefore relatively fast. The method can therefore be easily activated periodically in order to enable early recognition and compensation of possible aging effects. Subsequently, the determined correction values for the control quantities can be stored, in the context of an adaptation method, in cylinder-individual, operating-point-dependent characteristic fields, and can be made available to the engine control system.

In an example embodiment, the omitted energy release is compensated by controlling an air intake valve and/or an exhaust gas valve of the internal combustion engine. For example, the control quantities EV (exhaust valve timing) and IV (intake valve timing), which can influence the combustion position, are varied. In this way, for example, more hot exhaust gas can be introduced into the internal combustion engine. This can contribute to the acceleration of a combustion in a self-igniting internal combustion engine.

As an alternative, or in addition, the omitted energy release can be compensated by increasing a main injected quantity that is injected into the internal combustion engine. The increase in the main injected quantity accelerates the ignition of the fuel introduced into the internal combustion engine, and thus also contributes to compensating an omitted energy release during intermediate compression.

The control quantity SOI (start of injection of main injection), which can influence the combustion position, may also be varied. An earlier injection time causes for example an earlier position of the main combustion, and can thus compensate in particular the effect of an ineffective pre-injection (no energy release in the intermediate compression).

For example, provided that the determined pressure characteristic is greater than the target pressure characteristic, it can be determined that the energy release occurred during the intermediate compression. The present invention thus ensures a simple possibility, which can be executed quickly, for determining whether a pre-injection quantity was ignited during the intermediate compression or not.

In an example embodiment, the pressure characteristic is measured and evaluated individually for each cylinder. Thus, an energy release recognized as omitted for a cylinder can be compensated specifically for that cylinder. In this way, the optimal pre-injection quantity can be determined for each cylinder. Cylinder-individual aging processes can be compensated in this way by a precisely selected pre-injection quantity. This significantly improves the interaction of the various cylinders of an internal combustion engine. The present invention is not limited to a particular number of cylinders.

The prespecified target pressure characteristic can be a minimum energy release, an energy release being calculated from the determined pressure characteristic that is subsequently compared to the minimum energy release. Alternatively, the target pressure characteristic can also be a pressure signal, e.g. the average indicated pressure in the intermediate compression phase. Both target pressure characteristics ensure a reliable recognition of whether a pre-injected quantity was ignited during an intermediate compression or not.

In an advantageous development of the present invention, in order to determine a suitable pre-injection quantity at the beginning of the method, a prespecified minimum quantity is defined as a pre-injection quantity. This minimum quantity can be prespecified for example by the manufacturer of the internal combustion engine.

Preferably, after a determination that no energy release occurred during the intermediate compression, the commanded or desired pre-injection quantity can be increased by a prespecified quantity difference. This process can be repeated as often as necessary until the null quantity, i.e. the smallest pre-injection quantity at which an effective energy release during the intermediate compression is ensured, has been determined.

Advantageously, after it has been determined at least once that an energy release occurred during the intermediate compression, the associated pre-injection quantity is stored as a suitable pre-injection quantity. The suitable pre-injection quantity is then used for subsequent operation of the internal combustion engine. This ensures optimal operation of the internal combustion engine.

The advantages described above of the method for operating a self-igniting internal combustion engine also hold for a corresponding control device. The self-igniting internal combustion engine can be a gasoline engine.

DETAILED DESCRIPTION OF THE INVENTION

Figure 1:
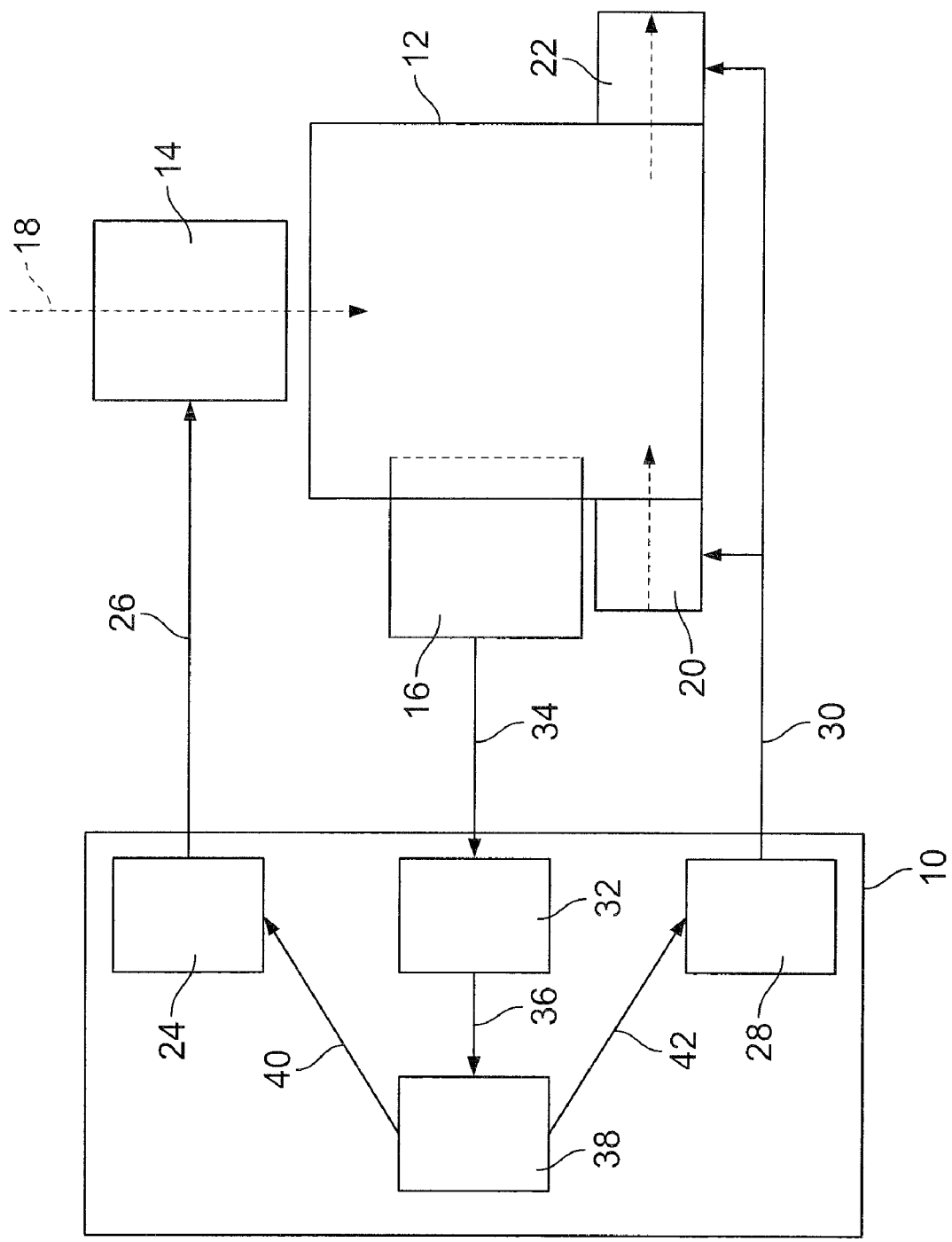
FIG. 1 shows a schematic representation of an example embodiment of the control device for operating a self-igniting internal combustion engine.

FIG. 1 shows a schematic representation of an example embodiment of the control device for operating a self-igniting internal combustion engine. Control device 10 can be situated close to a self-igniting internal combustion engine 12 having an injector 14, a pressure sensor 16, an air intake valve 20, and an exhaust gas valve 22. Alternatively, control device 10 can also be a component of a central vehicle control system. In this case, control device 10 is connected to components 14, 16, 20, and 22 via lines or via a vehicle bus.

Internal combustion engine 12 is for example a gasoline engine designed for an HCCI method or a CAI method. Internal combustion engine 12 can be an internal combustion engine having four cylinders. However, the present invention is not limited to a particular number of cylinders for internal combustion engine 12.

Using injector 14, a fuel 18 can be injected into internal combustion engine 12 for a pre-injection and a main injection.

Pressure sensor 16 is designed to measure the currently prevailing pressure inside the individual cylinders of internal combustion engine 12. Pressure sensor 16 preferably has a high time resolution. Air intake valve 20 controls the supply of fresh air to internal combustion engine 12. Exhaust gas valve 22 is used to release or retain an exhaust gas in internal combustion engine 12 after a combustion. However, exhaust gas valve 22 can also be designed to recirculate the exhaust gas from the exhaust gas tract back into internal combustion engine 12. The retained internal exhaust gases and/or the recirculated external exhaust gases support the combustion of the fuel 18 that is introduced into internal combustion engine 12 as the main injection quantity.

Control device 10 includes an injector control device 24. Injector control device 24 is designed to control injector 14 using a control signal 26 in such a way that prespecified fuel quantities for the pre-injection and the main injection are maintained by injector 14. In addition, control device 10 has an air control device 28 that controls air intake valve 20 and exhaust gas valve 22 via a second control signal 30 in such a way that prespecified opening and closing times are maintained for valves 20 and 22. The air control device thus determines the quantity of fresh air introduced into internal combustion engine 12, and the external and/or internal exhaust gas quantity.

The above paragraph can also be understood such that injector control device 24 and air control device 28 output to injector 14 and valves 20 and 22, via control signals 26 and 30, only the quantities that are to be maintained with regard to the pre-injection, the main injection, the fresh air, and the external and/or internal exhaust gases and/or the associated injection times and suction and/or exhaust times. In this case, injector 14 and valves 20 and 22 are designed to control themselves in such a way that the prespecified quantities and/or times are maintained.

In addition, control device 10 includes a comparator device 32 for receiving a sensor signal 34, having a pressure characteristic, outputted by pressure sensor 16. Comparator device 32 is also designed to compare the at least one received pressure characteristic with a prespecified target pressure characteristic and to provide a corresponding comparison signal 36. This takes place using an angular signal, also received by comparator device 32, which enables it to allocate the measured pressure values to a corresponding crank angle.

This comparison signal 36 is subsequently forwarded to an evaluation device 38 of control device 10. Evaluation device 38 is designed to determine at least one operator quantity for injector control device 24 and for air control device 28. The operator quantity for injector control device 24 can be an opening time for the main injection, a closing time for the main injection, a main injection position, and/or a main injection quantity. For air control device 28, evaluation device 38 can determine as at least one operator quantity an opening time of valves 20 and 22, a closing time of valves 20 and 22, an air intake time, an exhaust gas exhaust time, a fresh air quantity, and/or an internal and/or external exhaust gas quantity. Evaluation device 38 determines the operator quantities, taking into account comparison signal 36. Subsequently, the operator quantities determined by evaluation device 38 are communicated to injector control device 24 and to air control device 28 via data signals 40 and 42. An example for the operation of evaluation device 38 for determining the operator quantities is described in more detail below.

In the following, the functioning of control device 10 for determining a suitability of a specified null quantity as a pre-injection quantity is described:

In a first step, injector control device 24 controls injector 14 via control signal 26 in such a way that during a pre-injection the prespecified null quantity is introduced into a cylinder of internal combustion engine 12. During the immediately following intermediate compression, pressure sensor 12 measures the pressure prevailing inside the cylinder. The measured pressure is then outputted to comparator device 32 as sensor signal 34.

Comparator device 32 compares the determined pressure characteristic with the prespecified target pressure characteristic. The prespecified target pressure characteristic preferably corresponds to a pressure that is measured by pressure sensor 16 during the intermediate compression, provided that the null quantity is ignited.

If the determined pressure is greater than the target pressure characteristic, comparator device 32 determines that an ignition of the null quantity occurred during the intermediate compression. A corresponding comparison signal is subsequently outputted to evaluation device 38.

Evaluation device 38 is designed to compensate an omitted energy release in the intermediate compression. If the comparison signal indicates that an ignition of the null quantity occurred during the intermediate compression, evaluation device 38 does not perform an unnecessary compensation.

If a pressure characteristic is determined that is lower than the target pressure characteristic, comparator device 32 determines that no ignition of the null quantity occurred during the intermediate compression. In this case as well, a corresponding comparison signal 36 is outputted to evaluation device 38.

After receipt of a comparison signal 36 indicating that no energy release occurred during the intermediate compression, evaluation device 38 recognizes the increased risk of a too-late or missing ignition of the main injection quantity. In this case, evaluation device 38 indicates to injector control device 24 and to air control device 28, via data signals 40 and 42, that injector 14 and/or valves 20 and 22 are to be controlled in such a way that the omitted energy release is compensated. For example, for this purpose evaluation device 38 outputs an increased main injection quantity to injector control device 24. The increasing of the main injection quantity, or the setting earlier of the injection time, can accelerate the ignition of the fuel 18 injected into internal combustion engine 12 as the main injection. In this way, it is ensured at least for the next but one combustion cycle that a timely ignition of fuel 18 will take place.

In this case, air control device 28 also receives from evaluation device 38 at least one new operator value for valves 20 and 22. Air control device 28 thereupon controls the closing and opening times of valves 20 and 22 in such a way that an ignition of fuel 18 in internal combustion engine 12 is supported. In this way as well, it can be ensured that if an energy release does not take place during the intermediate compression, the ignition of fuel 18, or the main combustion, will take place in a timely manner at least in the next or next but one combustion cycle.

The effect on the main combustion of an omitted energy release during the intermediate compression is thus compensated. The missing ignition of the too-low null quantity thus does not have any effect on the driving characteristics of the vehicle. Thus, control device 10 is designed to determine the suitability of a fuel quantity as null quantity even while the vehicle is traveling.

If control device 10 determines that a prespecified null quantity is not suitable for operating internal combustion engine 12, for example due to aging effects in internal combustion engine 12, the control device increases the pre-injection quantity until a pre-injection quantity is reached at which an energy release is determined during the intermediate compression. This pre-injection quantity is subsequently stored as a suitable null quantity.

Figure 2:
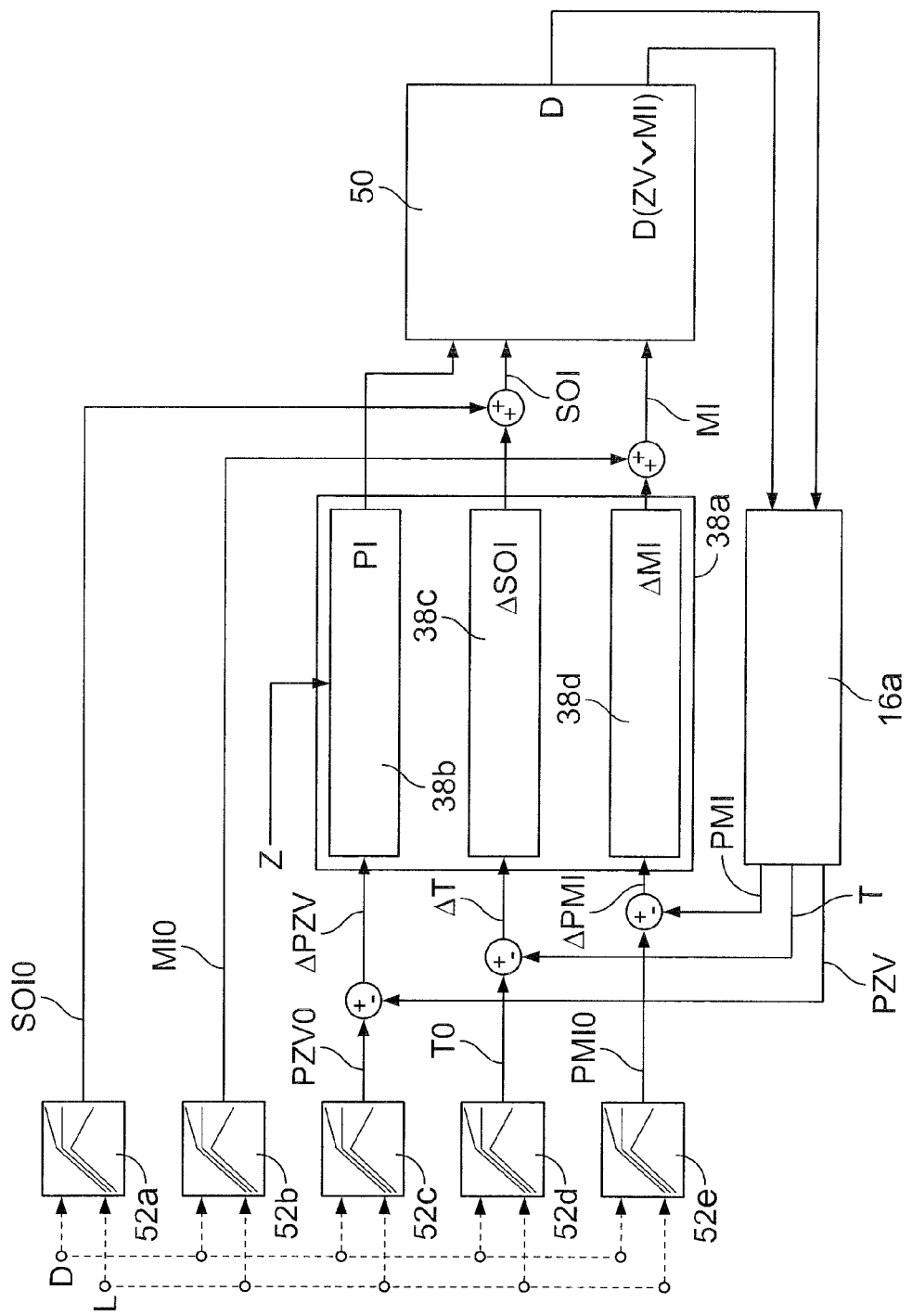
FIG. 2 shows a block diagram representing an example embodiment of the method for operating a self-igniting internal combustion engine.

FIG. 2 shows a block diagram representing an example embodiment of the method for operating a self-igniting internal combustion engine.

In a first step, a preset injection angle SOI0, a preset main injection quantity MI0 (main injection), a target pressure characteristic PZV0 corresponding to an average pressure during an intermediate compression, a target combustion position T0, and a target pressure characteristic PMI0 corresponding to a pressure during a main combustion (main ignition) are prespecified. The specification of the values SOI0, MI0, PZV0, T0, and PMI0 takes place for example via output subunits 52a to 52e. Output subunits 52a to 52e can be designed to provide values SOI0, MI0, PZV0, T0, and PMI0 as a function of a current rotational speed D and load L of a currently traveling vehicle.

In a next step, correction values $\Delta$SOI and $\Delta$MI are set equal to zero. This takes place for example via evaluation unit 38a. Evaluation unit 38a can include three controllers 38b, 38c, and 38d that are situated separately from one another, or can be fashioned as a compact unit. The precise functioning of correction values $\Delta$SOI and $\Delta$MI is described in more detail below.

With a first controller 38b, evaluation unit 38a outputs a minimum value as a pre-injection quantity PI. The minimum value can be stored on controller 38b by the manufacturer. Preferably, the minimum value corresponds to the smallest quantity of fuel at which a release of energy can still take place in the intermediate compression.

Subsequently, correction values $\Delta$SOI and $\Delta$MI are added to associated preset values SOI0 and MI0 to form an injection angle SOI and a main injection quantity MI. The air control time SOI and the main injection quantity MI are subsequently forwarded, together with pre-injection quantity PI, to an engine control system 50 in order to control the internal combustion engine (not shown).

Engine control system 50 is designed to operate the internal combustion engine as a function of provided operator values PI, SOI, and MI. Engine control system 50 makes sure that the quantities of fuel injected into the internal combustion engine correspond to pre-injection quantity PI or to main injection quantity MI and their associated injection angles. Alternatively, or in addition, the opening and closing of the air intake valve and of the exhaust valve can be controlled by engine control device 50 in such a way that the prespecified air control time SOI is maintained.

Engine control system 50 is also designed to measure rotational speed D and pressure curve P(ZV U MI) during operation of the internal combustion engine. Pressure curve P(ZV U MI) contains an item of information concerning a pressure during the intermediate compression and during the main combustion phase.

The measured values D and P(ZV U MI) are outputted to sensor unit 16a. Sensor unit 16a subsequently determines, on the basis of measurement values D and P(ZV U MI), the average pressure during main combustion phase PMI, combustion position T, and the average pressure during intermediate compression PZV. Subsequently, deviations $\Delta$PZV, $\Delta$T, and $\Delta$PMI of values PZV, T, and PMI (determined by sensor unit 16a) from prespecified target values PZV0, T0, and PMI0 are calculated. The deviations $\Delta$PZV, $\Delta$T, and $\Delta$PMI determined in this way are then outputted to above-named evaluation unit 38a.

Evaluation unit 38a recognizes on the basis of deviation $\Delta$PZV whether, during operation of the internal combustion engine, an average pressure PZV was measured in the intermediate compression that corresponds at least to target pressure characteristic PZV0. This is the case if deviation $\Delta$PZV$\geq$0. In this case, evaluation unit 38a recognizes that an energy release occurred during the intermediate compression. Current pre-injection quantity PI is thus sufficient for an ignition of the main-Ln combustion. Thus, the current pre-injection quantity PI can be used as a null quantity for operation of the internal combustion engine.

If deviation $\Delta$PZV is less than the null value, the average pressure PZV determined for the intermediate compression does not correspond to target pressure characteristic PZV0. Therefore, in the intermediate compression no energy release occurred because current pre-injection quantity PI was too low for an ignition. In this case, controller 38b outputs a new value for pre-injection quantity PI. Compared to the previous value for pre-injection quantity PI, this new value is increased by a prespecified difference.

Deviations $\Delta$T and $\Delta$PMI are also received and evaluated by evaluation unit 38a. Evaluation unit 38a then determines, as a function of deviations $\Delta$T and $\Delta$PMI, correction values $\Delta$SOI (already mentioned above) for the injection angle of the main injection and AMI for the main injection quantity. Evaluation unit 38a can also take deviation $\Delta$PZV into account in the determination of correction values $\Delta$SOI and $\Delta$MI.

In a development of the method of FIG. 2, evaluation unit 38a can also be designed to read in at least one additional signal Z in order to determine pre-injection quantity PI. For example, signal Z can be a start signal from which it follows that a new determination should be carried out of a null quantity that is suitable for operation of the internal combustion engine.

Figure 3:
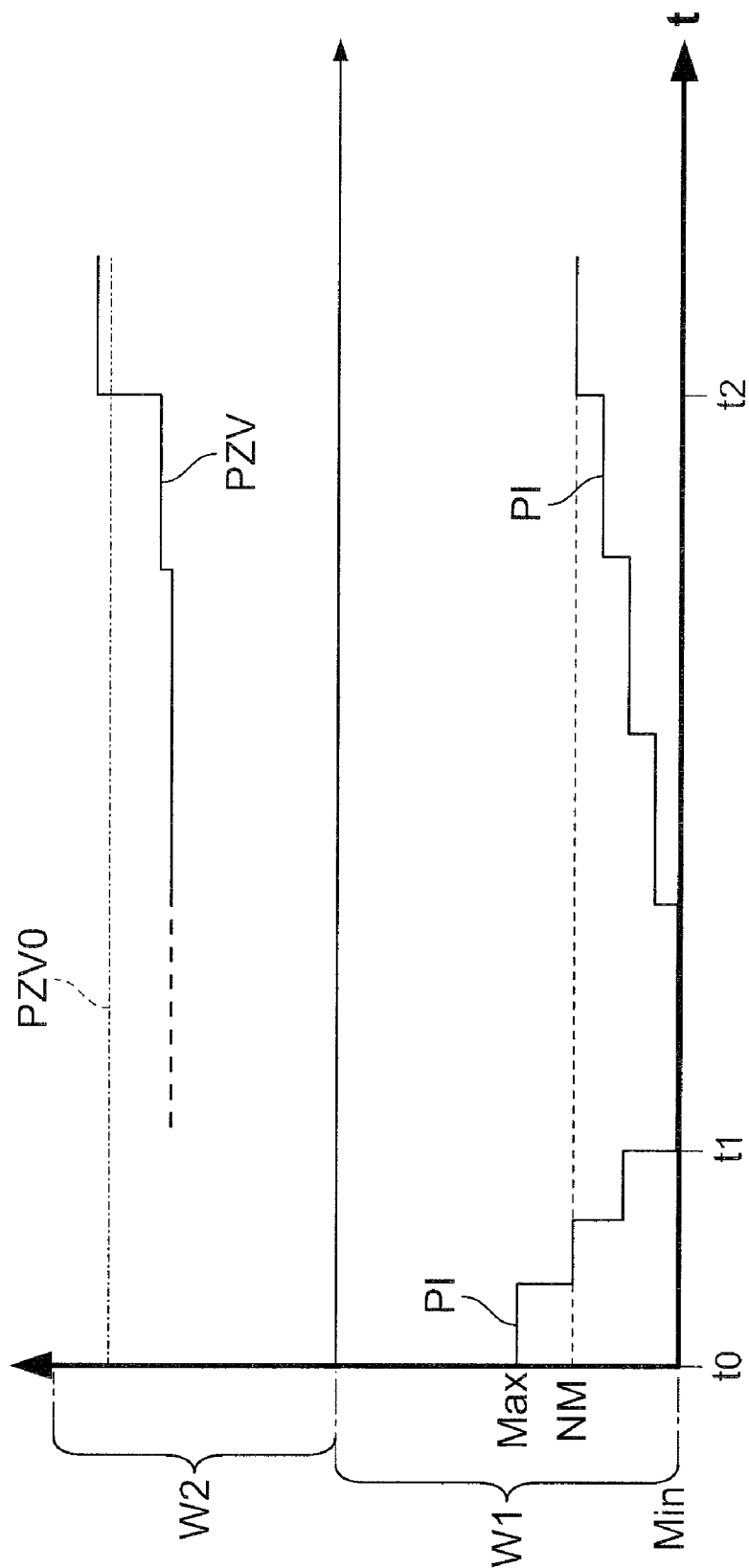
FIG. 3 shows a coordinate system with measurement curves as an example of results determined using the method of FIG. 2.

The continuation of the method of FIG. 2 can be explained on the basis of the measurement curves in the coordinate system shown in FIG. 3.

FIG. 3 shows a coordinate system having measurement curves as an example of results determined using the method of FIG. 2. Here, the abscissa of the coordinate system indicates time t. The ordinate of the coordinate system includes value ranges W1 for a quantity indication and W2 for pressure values. In the coordinate system of FIG. 3, two measurement curves PI and PZV are shown for pre-injection quantity PI and for average pressure PZV in the intermediate compression. In addition, target pressure characteristic PZV0 for the average pressure in the intermediate compression phase, prespecified as constant for the overall time t represented, is also shown in the coordinate system.

At a time t0, the method for determining a suitable null quantity for operating a self-igniting internal combustion engine is started. During a time duration from t0 to t1, pre-injection quantity PI is reduced stepwise from a maximum initial value Max to a minimum value Min. At the same time, control variables SOI and MI (not shown) are changed in such a way that they are capable of compensating a non-occurrence of the energy release during an intermediate compression phase. For example, for this purpose the difference between maximum initial value Max and minimum value Min of main injection quantity MI is proposed.

In a further step of the method, starting from time t2 the pre-injection quantity PI is increased stepwise until the determined average pressure in intermediate phase PZV exceeds prespecified target pressure characteristic PZV0. If measurement value PZV is greater than target pressure characteristic PZV0, this indicates that a pre-combustion has occurred during the intermediate compression phase.

The value of pre-injection quantity PI at which an average pressure PZV in the intermediate compression phase is first measured that is greater than target pressure characteristic PZV0 is subsequently stored as null quantity NT. The method is now terminated.

In the method shown on the basis of FIGS. 2 and 3, a pre-injection quantity, or the associated control duration, for the injector can be determined individually for each cylinder, for the pre-injection. Thus, the method can also be used to correct cylinder-specific aging processes.

Instead of a pressure value, a comparative energy quantity can also be prespecified as target pressure characteristic PZV0. The comparative energy quantity corresponds to the energy that is to be released at least during a pre-combustion. In this case, before a comparison the average pressure PZV measured in the intermediate compression is converted into a released energy quantity.

As an alternative, or in addition to injection angle SOI, a non-ascertained energy release during the intermediate compression can also be compensated via a control quantity for controlling an air intake valve and/or an exhaust gas valve. In this case, instead of or in addition to preset injection angle SOI0, another preset control quantity is prespecified. In this case, a correction value for the control quantity is determined as a function of a comparison of pressure characteristic PZV with target pressure characteristic PZV0.

In a development of the method, the influence of static cycle-to-cycle fluctuations on pressure characteristic PZV can be reduced by carrying out an averaging of pressure characteristic PZV over a plurality of cycles.

What is claimed is:

1. A method for operating a self-igniting internal combustion engine, comprising:
    introducing a prespecified pre-injection quantity of fuel into the internal combustion engine at least one of before and during an intermediate compression;
    determining a pressure characteristic in the internal combustion engine during the intermediate compression;
    prespecifying a target pressure characteristic;
    comparing the determined pressure characteristic with the prespecified target pressure characteristic;
    determining that no release of energy occurred during the intermediate compression, if the determined pressure characteristic is lower than the target pressure characteristic; and
    compensating for the effect of the non-occurrence of the energy release on a main combustion.

2. The method as recited in claim 1, wherein the compensating for the effect of the non-occurrence of the energy release includes controlling of at least one of an air intake valve and an exhaust gas valve of the internal combustion engine.

3. The method as recited in claim 1, wherein the compensating for the effect of the non-occurrence of the energy release includes an increase of a main injection quantity injected into the internal combustion engine.

4. The method as recited in claim 1, wherein if the determined pressure characteristic is greater than the target pressure characteristic, it is determined that the energy release occurred during the intermediate compression.

5. The method as recited in claim 1, wherein the pressure characteristic is measured individually for each cylinder, and the non-release of energy is determined for at least one individual cylinder.

6. The method as recited in claim 5, wherein the non-release of energy determined for the at least one cylinder is compensated specifically for the at least one cylinder.

7. The method as recited in claim 5, wherein a prespecified minimum quantity is determined as the prespecified pre-injection quantity.

8. The method as recited in claim 7, further comprising:
    if the determination is made that no energy release occurred during the intermediate compression, subsequently increasing the pre-injection quantity by a prespecified quantity difference, and repeating the method using the increased pre-injection quantity.

9. The method as recited in claim 7, further comprising:
    if the determination is made that energy release occurred during the intermediate compression, subsequently storing the prespecified pre-injection quantity as a suitable pre-injection quantity.

10. A control device for operating a self-igniting internal combustion engine, comprising:
    an injector control device configured to control an injector to introduce a prespecified pre-injection quantity of fuel into the internal combustion engine at least one of before and during an intermediate compression;
    a comparator device configured to (a) receive a pressure characteristic determined by a sensor during the intermediate compression, (b) compare the received pressure characteristic with a prespecified target pressure characteristic, and (c) provide a resulting comparison signal; and
    an evaluation device configured to (a) determine based on the comparison signal that no energy release occurred during the intermediate compression, if the comparison signal indicates the determined pressure characteristic is lower than the target pressure characteristic, and (b) control at least one of the injector, an air intake valve, and an exhaust gas valve of the internal combustion engine to compensate the effect of the non-occurrence of the energy release on a main combustion.

11. The control device as recited in claim 10, wherein the self-igniting internal combustion engine is a gasoline engine.

* * * * *